United States Patent Office 2,890,932
Patented June 16, 1959

2,890,932

SEPARATION BY ADSORPTION

Charles S. Lowe, Germantown, Ohio, assignor to the United States of America as represented by the United States Atomic Energy Commission No Drawing. Application May 7, 1951
Serial No. 225,058

15 Claims. (Cl. 23—14.5)

This invention deals with the removal of zirconium, niobium (columbium), and ruthenium values from aqueous solutions, and in particular with the separation of these values by adsorption.

It is an object of this invention to provide a process for the separation of zirconium, niobium and ruthenium from aqueous solutions of ores and other materials containing these elements.

It is another object of this invention to provide a process for separating fission product values from transuranic elements.

It is still another object of this invention to provide a process for the purification of plutonium and other transuranic elements.

These and other objects are accomplished by contacting the aqueous solutions containing the zirconium, niobium and/or ruthenium values with a hydrous aluminum silicate whereby said values are adsorbed. Naturally-occurring hydrous aluminum silicates as well as synthetic ones are suitable for the process of this invention. Especially good results were obtained with activated (acid-treated) montmorillonite type clay and activated bentonite clay. A bentonite clay made and sold by the Filtrol Corporation under the trade name of "Super Filtrol FO," which is also an acid-treated montmorillonite type clay and which contains about 20% of aluminum oxide and about 70% of silicon dioxide, the remainder being water of hydration and contaminating material such as iron, iron oxide, calcium oxide, sodium oxide, magnesium oxide, etc. has been found to give especially satisfactory results.

With Super Filtrol FO, a very high efficiency was obtained after one contact of a solution containing zirconium, niobium and ruthenium values with 100 g. of Super Filtrol FO per liter of solution; a decontamination factor of at least 3000 was found for zirconium and of 500 for niobium, and 20% of the ruthenium originally present was removed. Decontamination factor of an element is the ratio of the initial concentration of the element per unit of metal value being purified in the solution to the final concentration of the element per unit of metal value in the solution; the higher is the factor, the greater has been the removal of the element from the solution.

After adsorption, the Super Filtrol may be treated for recovery of the adsorbed elements. Thus, zirconium and niobium may be eluted, for instance, with a concentrated (6–8 N) nitric acid or with hot oxalic acid.

A number of tests were carried out in order to determine the minimum quantity of adsorbent necessary for complete adsorption of the elements to be removed from the aqueous solution. For this purpose, a dissolver solution was used which was obtained by dissolving neutron-irradiated uranium slugs in hot nitric acid and diluting the solution before cooling so as to obtain a final concentration of 52% uranyl nitrate hexahydrate, 1.5% nitric acid, 46.5% water, 0.01% plutonium (IV) nitrate and tracer concentration (from $10^{-6}$ to $10^{-12}$ M) of zirconium, niobium, ruthenium and other fission product values. In the first series of these tests, the quantity of adsorbent was increased from 20 g./liter to 100 g./liter and the accumulated amount of adsorbed substances determined in each case. The age of the solution used for these tests was forty-two days, and it had a pH value of between 0 and 0.1. The adsorbent, which was Super Filtrol FO, was contacted for one hour with the solution at a temperature of 100° C. One single contact was made, and after the contact the Super Filtrol FO was washed with water. The results, as illustrated on zirconium, are compiled in the following table.

Table I

| Adsorbent, g./liter: | Percent of adsorbed (accumulative) Zr |
|---|---|
| 20 | 93.6 |
| 40 | 95.2 |
| 60 | 96.5 |
| 80 | 96.5 |
| 100 | 96.5 |

These experiments show that the optimal quantity of Super Filtrol for a dissolver solution, under the conditions set forth above, is 60 g./liter of solution.

In some cases, the size of the apparatus at hand does not permit the use of this quantity of 60 g./liter. It was therefore also investigated whether a quantity of 20 g./liter and a three-fold contact would yield the same favorable results as one contact with 60 g./liter. For these tests, the same type of solution as for the previous tests was used, except that it was only two days old. Otherwise, the conditions were identical. The results are given in Table II.

Table II

| Adsorbent, g./liter: | Percent of adsorbed (accumulative) Zr |
|---|---|
| 20 | 92.2 |
| 20 | 96.9 |
| 20 | 99.0 |
| 40 | 98.5 |
| 40 | 99.6 |
| 40 | 99.8 |

These experiments illustrate that even better results may be obtained by using one-third of the optimal amount of adsorbent and instead contact three times.

Experiments were then carried out to determine the optimal acidity. It was found that pH values ranging from −0.5 to +2 give favorable results and that values from 0 to 1 are preferable. For instance, contacting for seventeen hours of a diluted dissolver solution at 100 to 105° C. with one-tenth of its volume of Standard Filtrol, an activated clay, yielded a gross $\gamma$-adsorption of 51.2% when the solution had a pH of −0.32 and of 85.3% with a pH of +0.50 but otherwise identical conditions. This high acidity is necessary in order to prevent the formation of zirconyl ions by hydrolysis; however, if the acidity is too high, the hydrogen cations compete with the zirconium cations in the adsorption and thus impair the efficiency of the process.

The pH values of two types of dissolver solutions, one received with a pH value of −0.3 and one of +1.20, were adjusted to various intermediate values by adding sodium hydroxide and nitric acid, respectively.

The solutions thus obtained, at a temperature of 100° C., were scavenged with Filtrol (20 g./liter of solution) by contacting for one hour, and the quantity of zirconium adsorbed was then ascertained. The results of these experiments are compiled in Table III.

Table III

| Initial pH of dissolver solution | pH of solution at scavenging | Percent Zr adsorbed |
|---|---|---|
| −0.3 | −0.3 | 91.1 |
|  | 0.1 | 97.7 |
|  | 0.3 | 95.1 |
|  | 0.8 | 88.8 |
|  | 1.1 | 90.0 |
|  | 1.4 | 90.8 |
| +1.20 | −0.37 | 93.6 |
|  | −0.2 | 93.8 |
|  | −0.1 | 72.7 |
|  | 0.0 | 77.2 |
|  | 0.1 | 83.8 |
|  | 0.2 | 72.7 |
|  | 0.25 | 84.2 |
|  | 0.70 | 84.2 |
|  | 1.20 | 70.1 |
|  | 1.70 | 77.4 |

While satisfactory results are obtained with a solution of room temperature, more favorable results are obtained with a solution of between 85 and 100° C. This is obvious from the following Table IV in which the results of experiments are listed carried out with solutions of various temperatures. In these experiments, the same dissolver solution was used as previously set forth having an age of twenty-seven and one-half days and a pH value of 0.5; in addition to the ingredients listed, however, the solution contained sodium dichromate in a concentration of 0.1 M. A quantity of 60 g. of Super Filtrol per liter of solution was used for a one-hour contact, and the Super Filtrol was then separated and washed with 0.01 N nitric acid.

Table IV

| Temperature, ° C.: | Zr adsorbed, percent of original content |
|---|---|
| 72.5 | 90.1 |
| 85 | 96.4 |
| 100 | 97.4 |

In the course of the many experiments carried out on the process of this invention, it was found that the age of the solution, e.g., of the dissolver solution, has some bearing on the efficiency of the process. It was discovered that a slight decrease of adsorption takes place with increasing age of the solution. The effect of the age of the solution is evident from the following Table V where again 60 g. of Super Filtrol per liter of dissolver solution at 100° C. where contacted for one hour.

Table V

| Solution age, days: | Zr adsorbed, percent |
|---|---|
| 2 | 99 |
| 5 | 97.2 |
| 42 | 96.5 |

If the solution to be treated contains plutonium as is, for instance the case in a dissolver solution, plutonium is almost quantitatively adsorbed as it is in the tetravalent state. However, hexavalent plutonium is taken up by the silicate adsorbents to a negligible degree only and mostly to a quantity of less than 0.1%. Therefore, in order to avoid adsorption of plutonium from solutions together with fission product values, it is advisable to oxidize the plutonium and to add a holding oxidant prior to the adsorption step. Two parallel experiments with plutonium (VI) solutions, having a pH of 0.1 and at 100° C. using 100 g. of Super Filtrol per liter of solution with a contact time of one hour, one carried out in the presence of 0.1 M $Na_2Cr_2O_7$ and the other one without any holding oxidant, yielded a plutonium adsorption of 2.9% and 28.7%, respectively. However, any plutonium adsorbed can be removed by washing the adsorbent with water or preferably with diluted nitric acid, that is, any hexavalent plutonium can be thus removed. The solutions obtained thereby may then be recycled for plutonium recovery.

A series of experiments was run to determine the most favorable conditions for eluting adsorbed plutonium (VI). Dissolver solution, five days old, having a pH of between 0 and 0.1, a temperature of 100° C. and containing 0.1 M sodium dichromate, was contacted for one hour with 60 g. Super Filtrol per liter of solution. The Super Filtrol was then separated from the supernatant liquor by centrifuging and finally washed four times consecutively with the various eluants to be tested. The first two washes were combined, and the third and fourth washes were combined. The first and second washes contained the liquid hold-up which was a matter of 1 or 2%. The third and fourth fractions then contained the material which was leached off the Super Filtrol. The results of these experiments are compiled in Table VI where in the first part the plutonium content, based upon initial content in the dissolver solution of the eluants is listed, while in the second part the plutonium remaining on the Super Filtrol, also based upon initial plutonium content in the dissolver solution, after the washes is given.

Table VI

|  | Wash Conditions | Pu, Percent |
|---|---|---|
| Third and fourth washes | $H_2O$ | 0.04 |
|  | 0.01 M $HNO_3$ | 0.075 |
|  | 0.05 M $HNO_3$ | 0.15 |
|  | 0.10 M $HNO_3$ | 0.28 |
| Filtrol | $H_2O$ | 0.29 |
|  | 0.01 M $HNO_3$ | 0.13 |
|  | 0.05 M $HNO_3$ | 0.12 |
|  | 0.10 M $HNO_3$ | 0.04 |

These tests show that nitric acid of a concentration of 0.1 N removes the bulk of the plutonium and thus is the most efficient eluant tested. Slight quantities of zirconium only were eluted by the various washes used. Recycling of the washes will accomplish further plutonium purification.

If, for some reason or other, the solution should not contain enough holding oxidant to maintain any plutonium present in the hexavalent state, large quantities of plutonium (IV) would also be adsorbed together with zirconium, niobium and/or ruthenium. Plutonium (IV) values, however, are not elutable with diluted nitric acid; the use of concentrated nitric acid, however, which removes plutonium (IV), is not feasible, because the zirconium, niobium and/or ruthenium values would also be eluted thereby.

In order to study the means for overcoming this difficulty, experiments were carried out using 0.01 N nitric acid together with sodium dichromate for oxidizing plutonium. For these tests, again a dissolver solution, as previously defined was used in which over 99% of the plutonium present was in the tetravalent state. The solution, having a temperature of 100° C., was mixed with Super Filtrol FO in a quantity of 60 g./liter of solution; the mixture was agitated for one hour. Thereafter the mother liquor was removed by centrifuging, and the Super Filtrol was then washed three times each with 0.01 N nitric acid at room temperature. By these four steps, a total of 41.95% plutonium (IV) was removed, while the other 58.05% remained on the Super Filtrol. The Filtrol was then leached for twenty hours at room temperature with a 0.1 M solution of sodium dichromate and thereafter washed three times with 0.01 M nitric acid at room temperature whereby altogether 3.9% of the adsorbed plutonium was removed. (From this low value, it may be safely deduced that the 41.95% of plutonium contained in the mother liquor plus the first three washes, was mainly unadsorbed plutonium and only to a very small degree plutonium eluted from the Filtrol by the first nitric acid washes.)

After removal of the 3.9% of plutonium, the Filtrol was leached six times (total duration four and one-half hours) again with 0.01 N nitric acid which this time had a temperature of 100° C. By these washes 93.2% of the initially adsorbed plutonium was removed, and less than 2.7% of initially adsorbed plutonium was found left on the Filtrol. This shows the superiority of hot nitric acid over nitric acid at room temperature. In all of these elution steps about 2.4% only of the adsorbed zirconium was removed from the Filtrol. Almost 97% of the zirconium content in the dissolver solution remained on the Filtrol.

Another experiment was carried out using the same type of solution and identical adsorption steps as in the preceding experiment. However, after the removal of the mother liquor by centrifuging and three nitric acid washes as set forth above (these four fractions contained 40.27% of the total plutonium originally present), the Filtrol was suspended in a solution of 0.05 N silver nitrate, and the plutonium (IV) was then oxidized to the hexavalent state by treating the suspension with a 15% ozone-oxygen mixture at room temperature. The flow rate of the ozone-oxygen mixture used was 18 ml./min./ml. of solution. The thus treated Filtrol was then separated from the solution and washed three times with 0.01 N nitric acid at room temperature. The three eluates obtained thereby contained over 75% of the total quantity of the plutonium initially adsorbed by the Filtrol, while only 0.17% of the zirconium was eluted.

These results show that while the elution with dilute nitric acid at 100° C. after the plutonium oxidation with sodium dichromate or other oxidizing agent is very satisfactory, good results are also obtained after ozonization in the presence of a catalyst and elution with nitric acid at room temperature. This latter procedure is the simpler and faster one and has the advantage of not requiring the incorporation of foreign ions.

The process of this invention is applicable to various kinds of solutions containing zirconium, niobium and/or ruthenium other than dissolver solutions. For instance, the process is highly satisfactory with plutonium-free solutions, such as waste solutions left after dissolver solutions have been treated and plutonium and uranium been removed. The following Table VII shows the results of adsorption tests carried out with a plutonium- and uranium-free waste solution by successively contacting this solution at 100° C. three times each with 60 g. of Super Filtrol FO per liter of solution for one hour each.

*Table VII*

|  | Percent of total activity adsorbed ||
| --- | --- | --- |
|  | Nb | Zr |
| After first contact | 98.2 | 94.4 |
| After second contact | 99.5 | 99.2 |
| After third contact | 99.8 | 99.8 |

When neutron-irradiated uranium slugs are dissolved in nitric acid the resultant solution of uranyl nitrate contains suspended solids. These solids may deposit on the packing of solvent extraction columns and cause emulsions during the solvent extraction of uranium and plutonium values. It has been found that if the solution containing suspended solids is contacted with Super Filtrol FO and the latter removed by centrifugation, a clear aqueous solution is obtained so that the Super Filtrol FO treatment with centrifugation serves a dual purpose of clarification of the solution as well as fission product decontamination.

It will be understood that this invention is not to be limited to the details given herein, but that it may be modified within the scope of the appended claims. For instance, a high degree of decontamination may be accomplished by repeating the adsorption process or by combining it with a separation process by solvent extraction.

What is claimed is:

1. A process of separating plutonium values from fission product values selected from the group consisting of ruthenium, niobium and zirconium values, comprising contacting a solid phase of hydrous aluminum silicate and a liquid phase of an aqueous nitric acid solution, one of said phases containing said plutonium and fission product values to be separated; incorporating an oxidizing agent for plutonium in the presence of an aqueous solution whereby the plutonium is converted to its hexavalent state; and separating a plutonium-containing aqueous solution from a fission-products-containing silicate.

2. The process of claim 1 wherein the oxidizing agent is sodium dichromate.

3. The process of claim 2 wherein the sodium dichromate is present in a concentration of about 0.1 M.

4. The process of claim 1 wherein the oxidizing agent is an ozone-oxygen mixture plus a silver nitrate catalyst.

5. The process of claim 4 wherein the ozone-oxygen mixture contains about 15% ozone and the silver nitrate is present in a concentration of about 0.05 N.

6. The process of claim 1 wherein the nitric acid solution has a pH value of between —0.5 and 2.

7. The process of claim 6 wherein the pH range is from 0 to 1.

8. The process of claim 1 wherein the step of contacting the liquid phase and the solid phase is carried out at elevated temperature.

9. The process of claim 8 wherein the temperature is between 85 and 105° C.

10. A process of separating plutonium valves from fission product values selected from the group consisting of ruthenium, niobium and zirconium values, comprising contacting a solid phase of hydrous aluminum silicate and a liquid phase of an aqueous nitric acid solution, said nitric acid solution having a pH value of between —0.5 and 2 and a temperature of between 85 and 105° C. and one of said phases containing said plutonium and fission product values to be separated; incorporating an oxidizing agent for plutonium in the presence of an aqueous solution whereby plutonium is converted to its hexavalent state; separating the plutonium-containing aqueous solution from a silicate containing fission products and some plutonium; contacting said silicate with dilute nitric acid whereby said plutonium is eluted from said silicate; and contacting said silicate with an acid solution, said acid being selected from the group consisting of concentrated nitric acid and oxalic acid, whereby said fission product values are eluted from said silicate.

11. The process of claim 10 wherein the dilute nitric acid is at a temperature of about 100° C. and has a concentration of between 0.01 and 0.1 M.

12. The process of claim 10 wherein the acid solution of elution of the fission product values is nitric acid of a concentration of between 6 and 8 M.

13. The process of claim 10 wherein the acid solution for elution of the fission product values is a hot aqueous oxalic acid solution.

14. The process of claim 10 wherein the silicate is activated bentonite clay.

15. The process of claim 10 wherein the silicate is activated montmorillonite clay.

References Cited in the file of this patent

UNITED STATES PATENTS 2,819,144    Seaborg et al. _____ Jan. 7, 1958

OTHER REFERENCES

Street et al.: The Ion Exchange Separation of Zirconium and Hafnium, Atomic Energy Commission Document AECD-2435, declassified November 10, 1948.

Bagchi: Journal of the Indian Chemical Society, vol. 26, pages 57-59 (1949).